US009310266B2

(12) United States Patent
Petrarca

(10) Patent No.: US 9,310,266 B2
(45) Date of Patent: Apr. 12, 2016

(54) STRAIN GAUGE PRESSURE SENSOR

(71) Applicant: Neil S. Petrarca, Warwick, RI (US)

(72) Inventor: Neil S. Petrarca, Warwick, RI (US)

(73) Assignee: Sensata Technologies, Inc., Attleboro, MA (US)

( * ) Notice: Subject to any disclaimer, the term of this patent is extended or adjusted under 35 U.S.C. 154(b) by 345 days.

(21) Appl. No.: 13/889,598

(22) Filed: May 8, 2013

(65) Prior Publication Data

US 2014/0331776 A1  Nov. 13, 2014

(51) Int. Cl.
*G01L 7/00* (2006.01)
*G01L 9/00* (2006.01)
*B60T 8/36* (2006.01)
*G01L 19/14* (2006.01)

(52) U.S. Cl.
CPC ............ *G01L 9/0051* (2013.01); *G01L 19/147* (2013.01); *G01L 19/148* (2013.01); *B60T 8/3675* (2013.01); *G01L 19/14* (2013.01); *Y10T 29/49117* (2015.01)

(58) Field of Classification Search
CPC . G01L 19/148; G01L 19/0084; G01L 19/142; G01L 19/147; G01L 19/143; G01L 9/0055
USPC ............... 73/756, 726, 720, 723, 700, 753
See application file for complete search history.

(56) References Cited

U.S. PATENT DOCUMENTS

| | | | |
|---|---|---|---|
| 5,181,417 A | | 1/1993 | Nishida et al. |
| 5,331,857 A * | | 7/1994 | Levine et al. ............... 73/756 |
| 5,587,535 A * | | 12/1996 | Sasaki et al. ............... 73/726 |
| 5,629,486 A * | | 5/1997 | Viduya et al. ............... 73/727 |
| 5,802,912 A * | | 9/1998 | Pitzer et al. ............... 73/756 |
| 6,119,524 A * | | 9/2000 | Kobold ............... 73/727 |
| 6,389,903 B1 * | | 5/2002 | Oba et al. ............... 73/756 |
| 8,104,357 B2 * | | 1/2012 | Schlitzkus et al. ............... 73/756 |
| 8,671,767 B2 | | 3/2014 | Kaiser et al. |
| 8,984,949 B2 * | | 3/2015 | Staiger et al. ............... 73/715 |
| 9,046,436 B2 * | | 6/2015 | Schlitzkus et al. |
| 2005/0103111 A1 | | 5/2005 | Imai et al. |
| 2008/0148860 A1 * | | 6/2008 | Murakami et al. ............... 73/726 |
| 2010/0192696 A1 * | | 8/2010 | Schlitzkus et al. ............... 73/756 |
| 2012/0067130 A1 * | | 3/2012 | Kaiser et al. ............... 73/706 |
| 2013/0052936 A1 * | | 2/2013 | Jordan ............... 454/338 |
| 2013/0192379 A1 | | 8/2013 | Petrarca |

FOREIGN PATENT DOCUMENTS

EP    2 620 757 A1    7/2013

OTHER PUBLICATIONS

European Search Report, EP14275131, dated Oct. 3, 2014.

* cited by examiner

*Primary Examiner* — Lisa Caputo
*Assistant Examiner* — Jonathan Dunlap
(74) *Attorney, Agent, or Firm* — Chapin IP Law, LLC

(57) ABSTRACT

A pressure transducer assembly that includes a pressure-responsive diaphragm to which a sensing element is mounted and an electronic package that includes wire-bonding pads adapted be electrically connected to the sensing element by wire bonding equipment. The diaphragm and wire bonding pads are supported within the transducer so that they lie in proximity to each other and in non-intersecting planes.

20 Claims, 5 Drawing Sheets

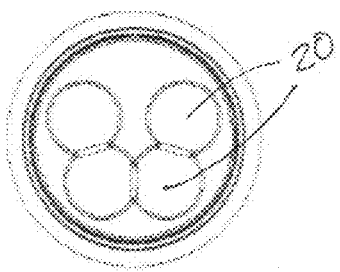
Fig. 3
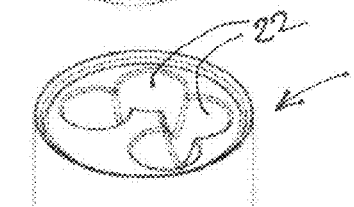
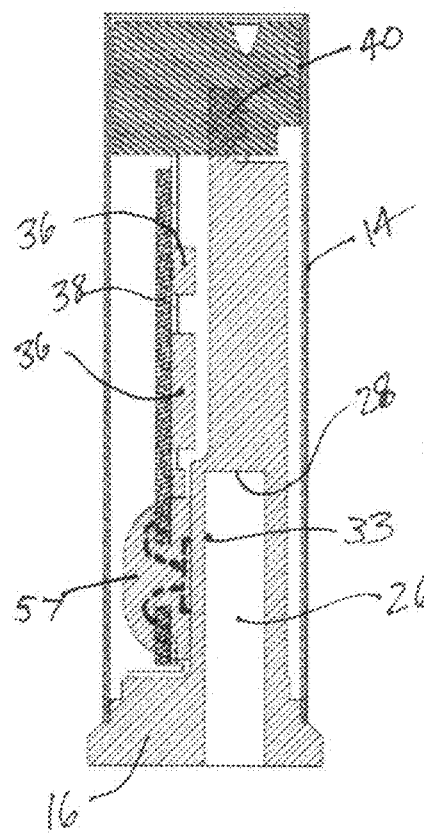
Fig. 1
Fig. 4
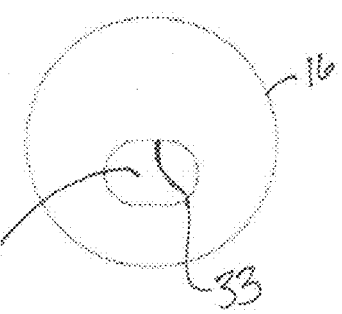
Fig. 2

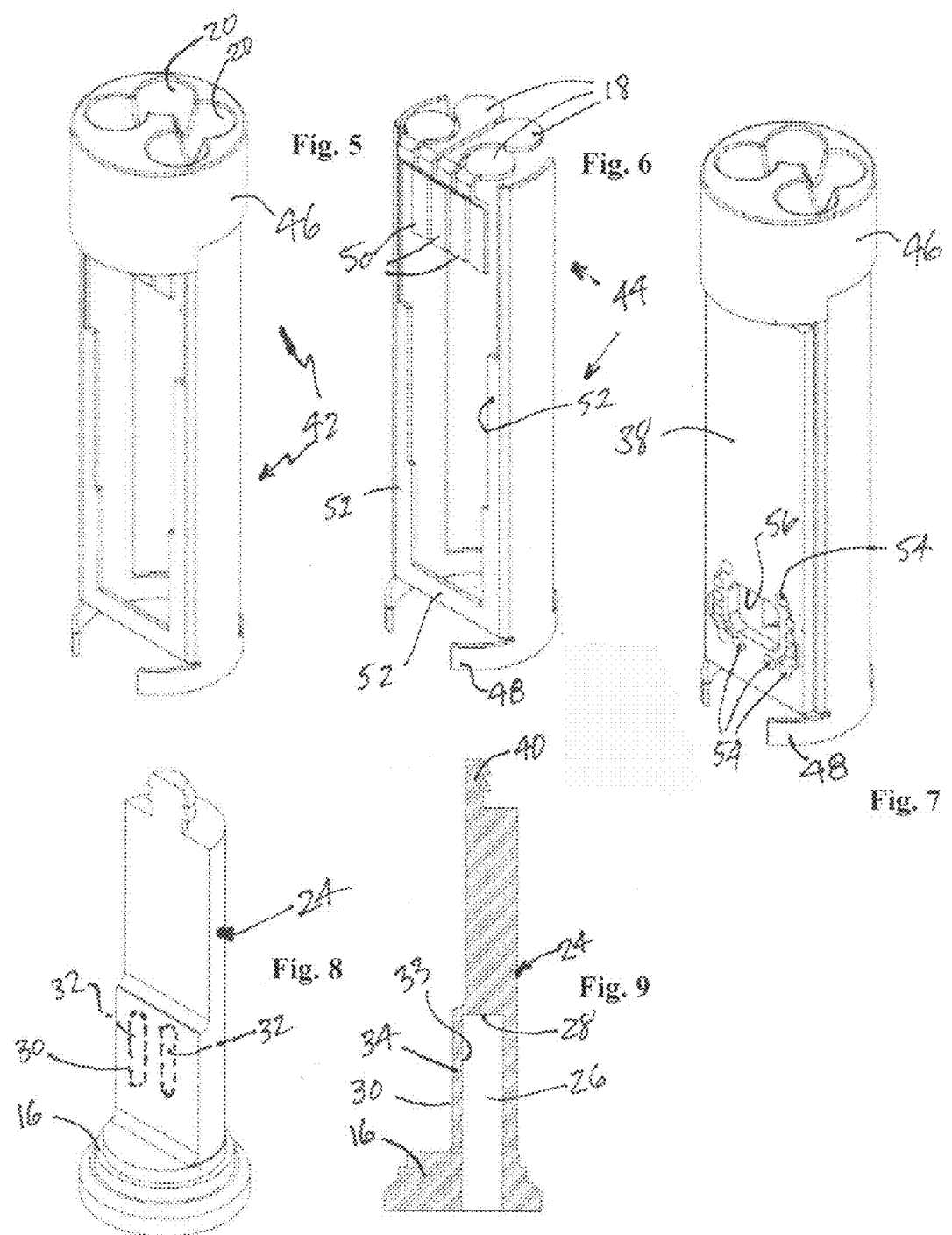

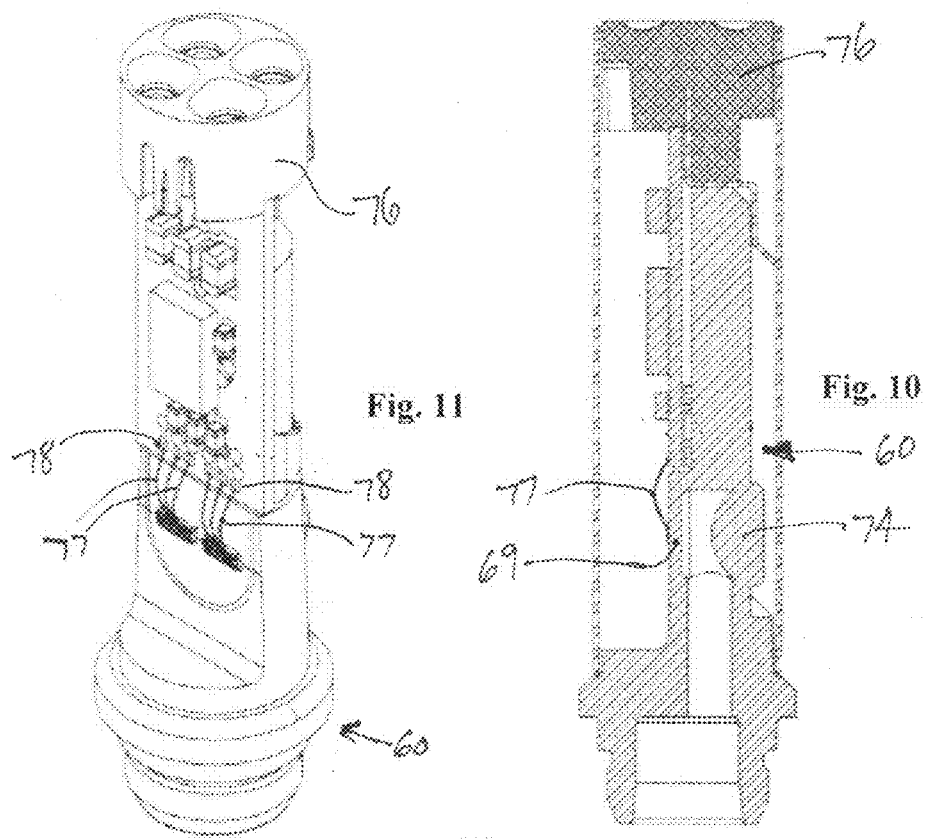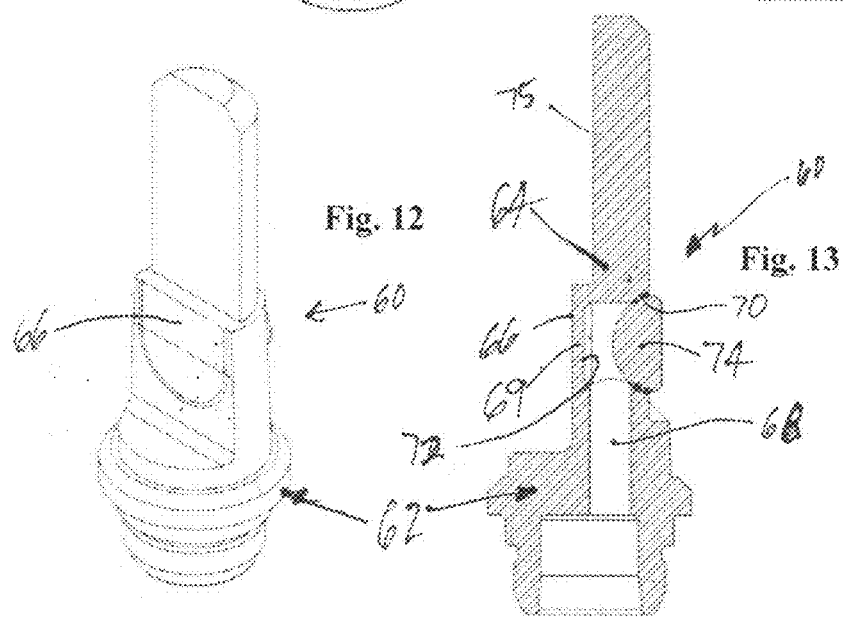

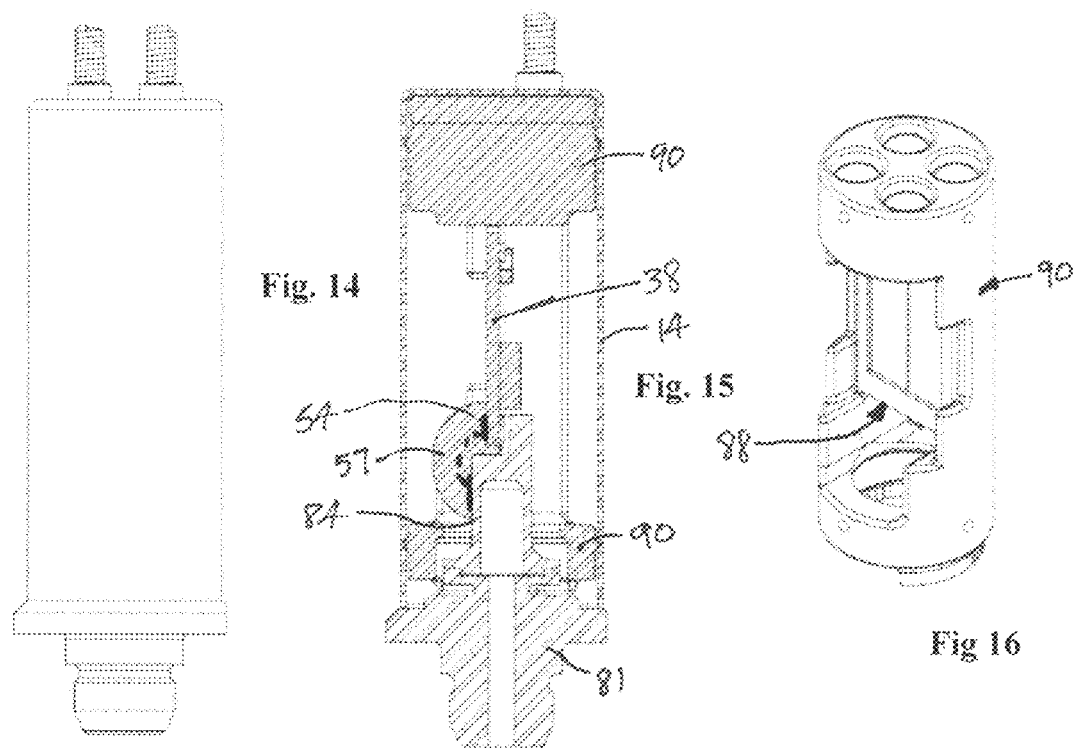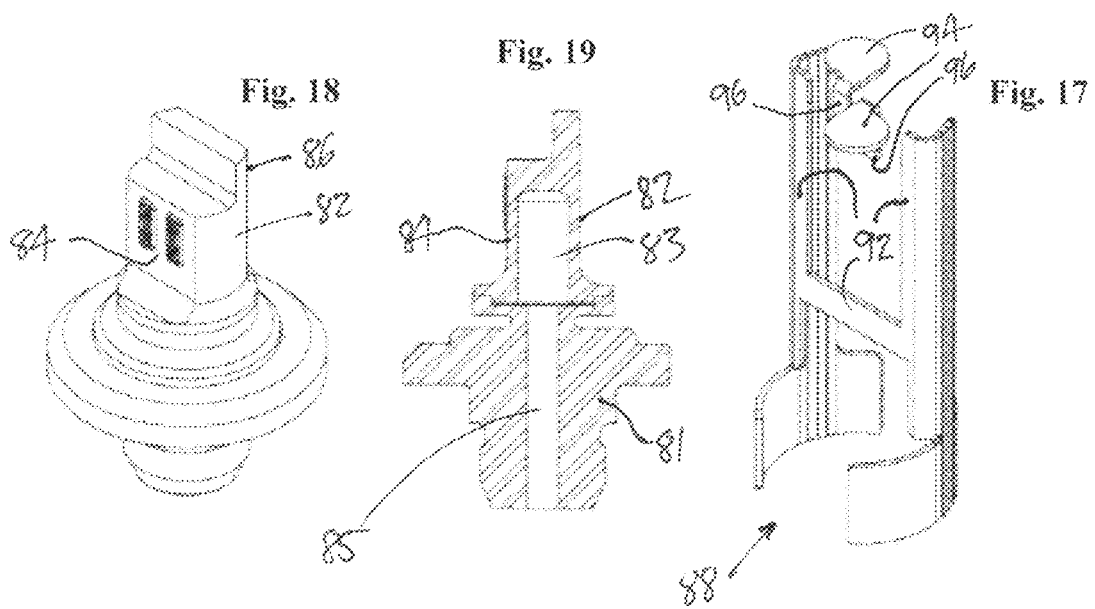

STRAIN GAUGE PRESSURE SENSOR

FIELD OF THE INVENTION

The invention relates to pressure transducers embodying strain gauge technology for sensing pressure changes in fluid systems to produce an electrical signal and to package structures and methods of construction for such transducers.

BACKGROUND OF THE INVENTION

Pressure sensing transducers incorporating microfused silicon strain gauge technology have found increasing use in many environments and for a variety of applications. Often they are used in environments where space limitations are a factor and, consequently, such transducers desirably are small in size and, for example, may be of the order of less than about one centimeter (e.g., 6-8 mm.) in diameter and a length of about two to three times the diameter. Among the many applications for such transducers include those in the automotive industry, for example, to sense pressure in fuel systems, braking systems, vehicle stability systems and the like. Such transducers typically include at least one fluid passageway that communicates the pressure source to be monitored (the "pressure environment") with a pressure-responsive diaphragm. At least one sensing element, such as a strain gauge, typically is mounted to a face of the diaphragm and is responsive to flexure of the diaphragm. The strain gauge is connected by slender wires to contact pads on a printed circuit board mounted within the transducer housing. The circuit board carries electronics components and circuitry to generate an electrical output signal indicative of the fluid pressure of the system being monitored. The output signals from the circuit board are picked up externally of the transducer by electrical connections accessible through the transducer housing. The configuration of the components of the transducer within the housing affects the size of the overall transducer and it is desirable to package those components to enable the overall size of the package to be reduced without compromising the performance or capacity of the transducer. Additionally, the arrangement of the internal components of the transducer may affect the integrity and reliability of the transducer. The present invention provides an improved construction and methods for such transducers.

SUMMARY OF THE INVENTION

A transducer assembly is provided with a pressure port that includes an integral base and a neck that extends from the base. The base is connectable to a fitting associated with the pressure environment or other device that contains or otherwise communicates with the pressure environment. The base of the pressure port has an aperture adapted to communicate with the pressure environment and an internal fluid passageway extends from the aperture into the neck. The fluid passageway and neck are configured so that a portion of the neck will define a thin elastic diaphragm along the side of the neck that can flex elastically in response to variations of fluid pressure within the fluid passageway. The diaphragm is formed to lie along a plane that extends along or substantially parallels a longitudinal axis of the transducer. One or more strain gauges are secured to the outer face of the diaphragm and are adapted to respond to the strain on the diaphragm as a function of the fluid pressure of the pressure environment.

An electronics package that includes a printed circuit board is supported within the transducer by an arrangement that includes a support assembly comprised of an electrically conductive lead frame and an integrated nonconductive support frame. The printed circuit board that contains the circuitry for the transducer is mounted to the metallic lead frame. The support assembly is mounted to the base portion of the pressure port and receives the neck of the pressure port, including the diaphragm. The support assembly is arranged with respect to the pressure port to support the printed circuit board so that wire bonding pads on the PC board that are to be connected to the strain gauges are arranged along a plane that is substantially parallel to the plane of the diaphragm and the strain gauges mounted to the diaphragm. The PC board preferably is arranged with its wire bonding pads in proximity to the strain gauges. By arranging the plane of the wire bonding pads of the PC board substantially parallel to the plane of the diaphragm and strain gauges, the wire bonding of the PC board to the strain gauges by conventional wire bonding machinery is facilitated. The arrangement enables the use of shorter bonding wires and provides for a more secure electrical and mechanical connection of the bonding wires to their associated contact pads on the PC board and strain gauges. Moreover orienting the diaphragm, strain gauges and wire bonding pads of the PC board in parallel planes simplifies the design and assembly methods for electrically connecting the strain gauges and wire bonding pads of the PC board. The arrangement also enables the PC board to extend lengthwise of the transducer, thus avoiding restrictions on the size of the PC board that would result if the PC board were oriented perpendicular to the plane of the diaphragm and strain gauges.

DESCRIPTION OF THE DRAWINGS

The objects and advantages of the invention will be appreciated more fully from the following description of the invention with reference to the accompanying drawings in which:

FIG. 1 is an isometric illustration of a representative transducer;

FIG. 2 is an illustration of the bottom of the base of the transducer shown in FIG. 1;

FIG. 3 is a plan view of the top of the transducer of FIG. 1;

FIG. 4 is a longitudinal sectional illustration of one embodiment of a transducer taken along a longitudinal diametrical plane;

FIG. 5 is an isometric illustration of the support assembly of the embodiment of FIG. 4;

FIG. 6 is an isometric illustration of the lead frame of the embodiment of FIG. 4;

FIG. 7 is an illustration similar to FIG. 5 with a printed circuit board mounted to the support assembly of FIG. 5;

FIG. 8 is an isometric illustration of an embodiment of a pressure port;

FIG. 9 is a longitudinal sectional illustration of the pressure port of FIG. 8;

FIG. 10 is a longitudinal sectional illustration of another embodiment of a transducer incorporating principles of the invention;

FIG. 11 is an illustration of the assembled embodiment of FIG. 10 with the cover removed;

FIG. 12 is an isometric illustration of the pressure port of the pressure port of FIG. 10;

FIG. 13 is a longitudinal sectional illustration of the pressure port of FIG. 10;

FIG. 14 1 is a side elevation of a third embodiment of the invention;

FIG. 15 is a longitudinal sectional illustration of the embodiment of FIG. 14;

FIG. 16 is an isometric illustration of the support assembly of FIG. 15 where the lead frame mounted in the support frame;

FIG. 17 an isometric illustration of the lead frame FIG. 14-16;

FIG. 18 is and isometric illustration of the pressure port of the pressure port of FIG. 15;

FIG. 19 is a sectional illustration of the pressure port of FIG. 15;

DESCRIPTION OF THE ILLUSTRATIVE EMBODIMENTS

Figure 20:
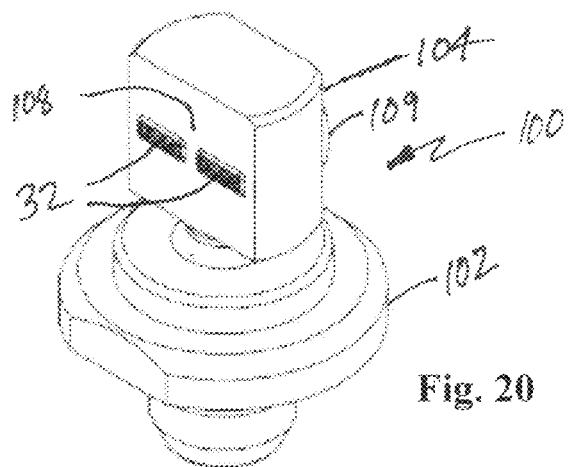
FIG. 20 is an isometric illustration of another embodiment of the pressure port.

FIG. 1 illustrates a transducer 10 having a pressure port 12 and an upwardly extending housing 14 attached to a base 16 of the pressure port and terminating at its upper end 18 in electrical contacts or connectors by which electrical output signals may be transmitted and utilized. In this embodiment the electrical contacts may be in the form of contact pads 20 that are accessible through sockets 22 formed in the upper end of the device.

As shown in FIGS. 4, 8 and 9, the pressure port 12 may be formed as a single monolithic piece from various materials with 17-4 stainless steel being preferred. The pressure port includes the base 16 and an upwardly extending neck 24. The base 16 and lower portion of the neck 24 are formed to include a fluid passageway 26 that terminates in a closed upper end 28. The lower portion of the neck is formed to include a flat external face 30 along its side to which one or more strain gauges (shown in phantom at 32) are mounted. At least an upper portion of the passageway 26 is formed to have a cross-section defining a flat inner face 33 that cooperates with the flat surface 30 to define a thin, flexible diaphragm 34 along a region of the neck. In this embodiment the cross-section of the passageway may be obround as illustrated in FIG. 2. The obround cross-sectional shape of the passageway may be formed by boring a hole through the base and lower portion of the neck and translating the boring tool laterally. The obround cross-section of the passageway leaves the longitudinally extending flat inner surface 33 that cooperates with the flat outer surface 30 to define an elongate configuration for the diaphragm 34.

The upper portion of the neck 24 may be flat and recessed from the plane of the flat surface 30 to provide space for the electrical components 36 mounted on a printed circuit board 38 as suggested in FIG. 4. The uppermost end of the neck 24 may be formed to define a snap-in connector element 40 that may be used to help secure a support assembly to the neck.

FIG. 5 shows a support assembly 42 by which the PC board 38 is supported in the transducer. The support assembly 42 includes an electrically conductive lead frame 44 and a nonconductive support frame 46 that are integrally secured together. The lead frame may be formed from any suitable material that is electrically conductive and is sufficiently structurally rigid. For example, the lead frame may be stamped and formed from a sheet of stainless steel. The lead frame may have portions that desirably are plated to increase the electrical conductivity of those portions. The support frame may be formed from any of a variety of polymeric or engineered materials such as, for example, from a liquid crystal polymer. The lead frame may be insert molded with the support frame. When the device is assembled, the support assembly 42 is disposed about the neck 24 of the pressure port 12 and the lower end is secured to the base 22. In this embodiment arcuate segments 48 at the lower end of the lead frame 44 define the lower end of the support assembly 42. The arcuate segments 48 conform to the contour of the base 22 and can be laser welded or otherwise secured to the base. In this embodiment the support frame 46 is attached to the upper end of the lead frame 44 and also supports a number of depending conductive tabs 50 that are connected to contact pads 18 accessible through sockets 20 formed in the support frame 46 (FIG. 6). The tabs 50 can be formed initially as part of the lead frame 44 and later severed from the frame after the portions defining the tabs 50 have been securely mounted in the support frame 46. The severed tabs 50 provide electrically isolated conductive paths from the PC board to the externally accessible contact pads 20.

The PC board 44 is attached to the lead frame 44 preferably by soldered connections between the two. To that end, the surface of the PC board that faces the lead frame includes metallic, structurally secure, surfaces that can be soldered to facing surfaces 52 of the lead frame. The connection to the lead frame also may serve as a ground for the PC board circuitry. Similarly contact pads formed on the PC board are oriented in alignment with the conductive tabs 50 supported by the support frame 46 so that the contact pads can be soldered to the conductive tabs 50. The lead frame is secured to the support frame and the base so that its facing surfaces 52 to which the PC board is secured are arranged to lie along a plane that parallels the flat surface 30 and diaphragm 34 of the neck. FIG. 7 illustrates the support assembly with the PC board mounted in place. In this embodiment the PC board includes a number of wire bonding pads 54 disposed about an opening 56 in the board. The opening 56 is in registry with the strain gauges 32 (FIG. 4). The bonding pads 54 are disposed in a plane the parallels the plane of the diaphragm 34 and the strain gauges. The arrangement enables a wire-bonding machine (see, e.g., FIG. 23) to place and attach the ends of bonding wires 55 to selected bonding pads 54 the PC board, pass them through the opening 56 and attach their other ends two selected points on the strain gauges. After the wire bonding connections have been made, the wires, strain gages and wire bonding pads may be encapsulated in a gel 57 or other suitable material to protect the connections. By orienting the strain gauges, diaphragm and PC board wire bonding pads in parallel planes, the design of the transducer is simplified in that it does not require inclusion of specially designed connector elements to connect the PC board to the strain gauges.

FIGS. 10-13 illustrate another embodiment of the invention that differs from that of FIGS. 1-9 in that the fluid passageway through the pressure port is formed in a different manner and where the base of the pressure port includes a nipple adapted to engage with a corresponding fitting in communication with the pressure environment. It should be understood that the transducers may be formed to have bases variously configured to connect to any type of pressure environment and may include specially formed bases of which those illustrated in the drawings are merely representative.

FIGS. 12 and 13 illustrate the pressure port 60 of FIG. 11. The pressure port is formed to include a base 62 and a neck 64 extending upwardly from the base 62. The neck 64 is formed to include a flat outer face 66 to which the strain gauges are mounted. A fluid passageway 68 is formed longitudinally through the base and the lower portion of the neck. In this embodiment the cross-section of the passageway comprises a fluid passageway 68 terminating near the top of the lower portion of the neck. The diaphragm 69 is defined along the side of the neck by machining a hole 70 through the back of the neck adjacent the upper end of the fluid passageway 68 and leaving a finished inner surface 72, the thickness of the resulting diaphragm 69 corresponding to the distance between the outer face 66 and inner surface 72. The hole 70 then is closed, as by a plug 74, that can be welded securely to seal the hole. The upper portion 75 of the neck 64 may be recessed from the plane of the outer face 66, in this case to provide space for the PC board 38. As illustrated in this embodiment, the components of the PC board 38 may be arranged to face outwardly. In this embodiment the support assembly 76 is similar to that of the previous embodiment, modified as necessary to accommodate the dimensions and configurations of the internal components. As shown in FIGS. 11 and 12 the PC board is provided with wire bonding pads 78 that lie substantially in the same plane as that of the diaphragm 69. In this embodiment the bonding wires 77 may be relatively short and require relatively little bending, resulting in less risk of wire damage during bonding as well as when in use.

FIGS. 14-19 illustrate a third embodiment of the invention in which the pressure port 80 has a truncated neck 82. This embodiment illustrates that the port 80 may be made from two separately formed pieces that are joined together. This may be desirable, for example, in an application where the fluid passageway through the base must be smaller in cross-section than the passageway in the neck where the diaphragm is defined. In this case the base portion 81 can be formed separately and subsequently joined to the neck portion 82. Here, the passageway 83 through the neck may be obround in cross-section while the passageway 85 through the base may be circular in cross section. As shown in FIGS. 18 and 19 the diaphragm is defined along the flat outer face 84 of the neck 82. The upper portion 86 of the neck is short to leave space above the neck 82 for electrical components supported on the PC board.

The support assembly is illustrated in FIG. 16 and includes a lead frame 88 and a support frame 90 into which the lead frame is incorporated. As shown in FIGS. 16 and 17, in this embodiment the PC board 34 will be supported so that its wire bonding pads 54 are disposed in a plane paralleling that of the diaphragm 84 on the lower part of the neck 82. In this embodiment the support frame 90 is shown as extending nearly the full length of the lead frame 88. As with the previously described embodiments, the lead frame 88 (FIG. 17) includes bonding surfaces 92 to which the PC board can be soldered as well as contact pads 94 and tabs 96 connectable to corresponding contact pads on the PC board. In this embodiment, as shown in FIGS. 16 and 17, planes of the diaphragm 84 and of the wire bonding pads 54 on the PC board are arranged in parallel planes offset from each other.

Figure 21:
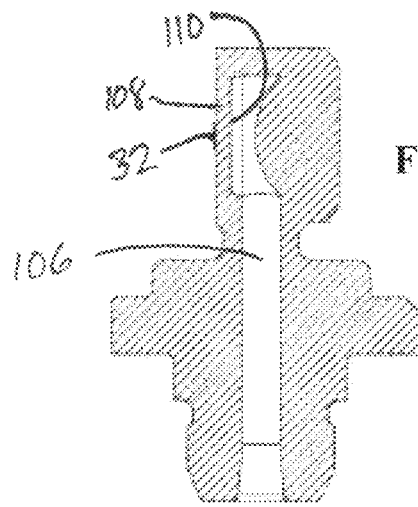
FIG. 21 is a longitudinal sectional illustration of the pressure port of FIG. 20.
Figure 22:
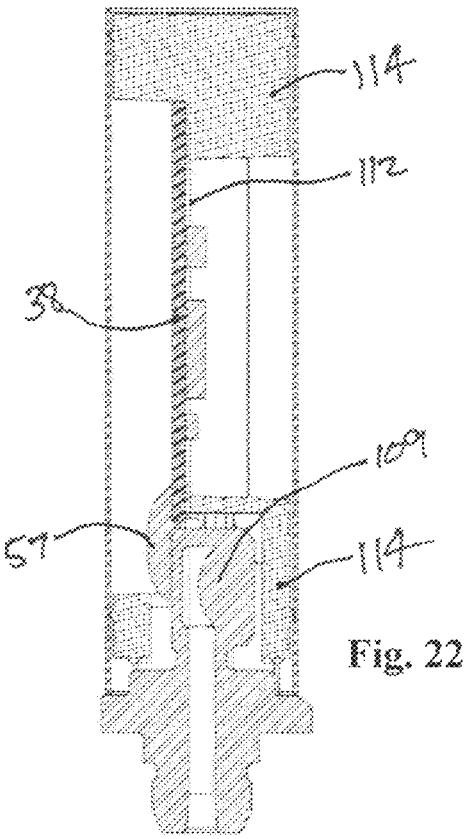
FIG. 22 is a longitudinal sectional illustration of a transducer embodying the pressure port of FIG. 20.

FIGS. 20, 21 and 22 illustrate yet another embodiment of the invention having a truncated neck similar to that of FIGS. 15-19 but with the fluid passageway and diaphragm being formed in a manner similar to that of the embodiment of FIGS. 11-14. In this embodiment the port 100 can be of one-piece construction including a monolithic base 102 and neck 104 and having a passageway 106 bored through both the base and neck. The diaphragm 108 is formed by creating an aperture through the backside of the neck 104 to communicate with the passageway 106 and form the inner surface 110 of the diaphragm 108. The aperture then is sealed closed by a plug 109 that is laser welded in place. In this embodiment, as with all embodiments of the transducer incorporating the principles of the invention, the support assembly, including a lead frame 112 and support frame 114 is configured to provide a secure support to accommodate the components of the device and provide electrical connections as needed for the particular application. It may be noted that in this embodiment the diaphragm and strain gauges lie in approximately the same plane as the wire bonding pads on the PC board, to achieve the advantages discussed above.

Figure 23:
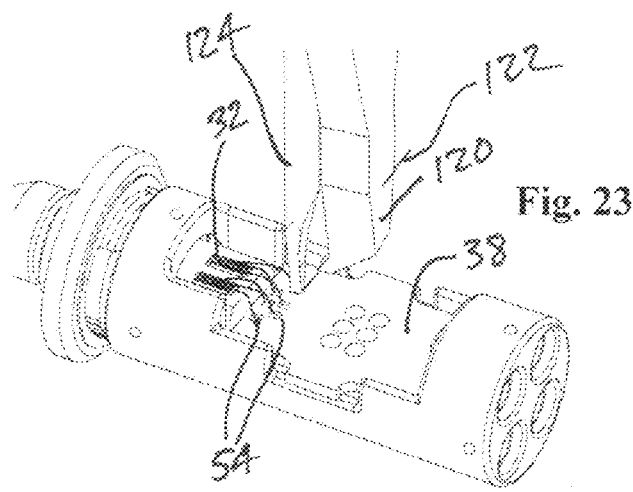
FIG. 23 is an isometric illustration of a representative transducer in which the wire bonding pads of the PC board and the diaphragm lie in parallel, space planes and showing the manner in which wire bonding between the strain gauges and bonding pads of the PC board are effected.

FIG. 23 illustrates a transducer, such as that shown in FIGS. 14-19 during the wire-bonding portion of the assembly process. A computer-controlled machine having a feeding head 120 through which wire 122 is guided effects the wire bonding between the strain gauges 32 and the wire bonding pads 54 on the PC board 38. The machine includes an adjacent ultrasonic bonding hammer 124. The feeding head and bonding hammer are movable in directions parallel to the planes of the wire bonding pads and strain gauges to orient them in position with a specific contact pad or contact point on a strain gauge. The feeding head and hammer are translated to position them appropriately with respect to a bonding pad on the PC board or point on a strain gauge. The machine feeds a length of wire through the feeding head to locate an end of the wire over a point on the strain gauge and the ultrasonic hammer than is brought downwardly to clamp the wire to the strain gauge contact point. So clamped, ultrasonic welding energy is applied to the hammer generate sufficient heat to fuse the end of the wire to the contact point. The operation is repeated to position and will bond the other end of the wire to that pad and to sever the wire from the wire supply. The process is repeated to connect the strain gauges to the remaining wire bonding pads on the PC board.

It should be understood that the term "pressure environment" is not meant to imply any particular degree of high or low pressure and that directional terms such as "top", "bottom," "upper," "lower," "front," "back," are intended to describe relative orientation of the components of the transducer and do not refer to the orientation of the transducer itself with any external structure or respect to the system with which it is used. All such terms are used merely for convenience in explaining the invention.

From the foregoing it will be appreciated that the invention provides arrangements and methods for supporting and packaging the components of a pressure transducer that simplifies the electrical coupling between the sensor elements and electronic circuitry for generating an output signal responsive to the sensor elements. The invention enables slender wired to be bonded wire bonding pads and connection points on sensing elements with reduced risk of damage to the wires.

It also should be understood that the foregoing description of the invention is intended merely to be illustrative and that other embodiments, objects, advantages and may be apparent to those skilled in the art without departing from its principles.

What is claimed is:

1. A pressure sensor assembly comprising:
   a pressure port having a base and a neck extending upwardly from the base, the neck including a sidewall;
   a fluid passageway formed through the base and into the neck, the base being connectable to a fluid pressure environment;
   a diaphragm disposed along the side wall of the neck, the diaphragm having an outer face and an inner face, inner face exposed to the fluid passageway the sidewall of the neck having a flat outer surface that defines the outer face of the diaphragm, the inner surface of the neck machined to define a circular flat inner surface that parallels the outer face and defines the diaphragm;

a sensing element responsive to diaphragm movement mounted on the outer surface of the diaphragm;

an electronics package mounted adjacent the neck and including wire bonding pads to facilitate wire connection between the electronics package and the sensing element;

the wire bonding pads and the diaphragm being disposed in planar alignment.

2. The pressure sensor of claim 1 wherein the wire bonding pads and the diaphragm lie in substantially parallel planes.

3. The pressure sensor of claim 1 wherein the wire bonding pads and the diaphragm lie in the same plane.

4. The pressure sensor of claim 1 wherein the sensing element comprises a strain gauge.

5. The pressure sensor of claim 4 further comprising wires bonded to the strain gauge and the bonding pads to connect, electrically, the strain gauge with the electronic package.

6. The pressure sensor of claim 1 wherein the flat inner surface of the neck is defined by a section of the passageway being obround in cross-section.

7. The pressure sensor of claim 6 wherein the obround cross-sectional shape is formed by boring a hole through the base and a lower portion of the neck and translating the boring tool laterally.

8. The pressure sensor of claim 1 further comprising a hole formed through the side of the neck that is opposite of the flat surface, the aperture being in communication with the passageway; and a plug covering and sealing the hole in the neck.

9. The pressure sensor of claim 1 further comprising a cover disposed about the neck and electronic package, the lower end of the housing being secured to the base of the pressure port in sealed relation thereto, and an electrical interface enabling connection to the electronic package exteriorly of the housing.

10. The pressure sensor of claim 1 further comprising the electronic package comprising a printed circuit board supported to lie a long a plane that extends longitudinally of the pressure port.

11. The pressure sensor of claim 1 wherein the base and the neck of the pressure port are formed as a single monolithic piece.

12. The pressure sensor of claim 1 wherein the base and neck of the pressure port are formed from separate pieces that are joined together.

13. In a pressure transducer having a pressure port with a base and a neck extending upwardly from the base, a fluid passageway extending through the base and the neck, a diaphragm disposed on a sidewall of the neck and having an outer and inner faces, the inner face being in communication with the fluid passageway, an electronic package having wire bonding pads, and at least one strain gauge mounted to the outer face of the diaphragm, the improvement comprising:

the diaphragm being disposed along a side of the neck, the sidewall of the neck having a flat outer surface that defines the outer face of the diaphragm, an inner surface of the neck machined to define a circular flat inner surface that parallels the outer face and defines the diaphragm;

the diaphragm and the wire bonding pads being supported and disposed in planar alignment.

14. The pressure transducer as defined in claim 13 wherein a plane of the wire bonding pads and a plane of the diaphragm are parallel.

15. The pressure transducer is defined in claim 13 wherein the wire bonding pads and diaphragm lie in the same plane.

16. A method for making a pressure transducer comprising:
providing a pressure port having a base, a neck extending upwardly of the base and a fluid passageway extending through the base and into the neck;

forming the neck to define a diaphragm along the side of the neck and lying along a plane extending lengthwise of the pressure port, the sidewall of the neck having a flat outer surface that defines an outer face of the diaphragm, an inner surface of the neck machined to define a circular flat inner surface that parallels the outer face and defines the diaphragm;

mounting a sensor element on the outer surface of the diaphragm;

providing an electronics package having wire bonding pads to facilitate wire connection between the electronics package and the sensing element;

supporting the package with the pads lying in planar alignment with the plane of the diaphragm; and using a wire bonding machine, attaching wires between points on the strain gauge and the wire bonding pads.

17. The method as defined in claim 16 wherein the wire bonding pads and diaphragm are disposed in substantially the same plane.

18. The method as defined in claim 16 wherein the wire bonding pads and diaphragm are disposed in substantially parallel planes.

19. A pressure sensor assembly comprising:
a pressure port having a base and a neck extending upwardly from the base, the neck including a sidewall and an access hole;

a fluid passageway formed through the base and into the neck, the base being connectable to a fluid pressure environment;

a diaphragm disposed along the side wall of the neck, the diaphragm haying an outer face and an inner face, the inner face exposed to the fluid passageway the sidewall of the neck having a flat outer surface that defines the outer face of the diaphragm, the inner surface of the neck machined to define a flat inner surface that parallels the outer face of the diaphragm;

a sensing element responsive to diaphragm movement mounted on the outer surface of the diaphragm;

an electronics package ,mounted adjacent the neck and including wire bonding pads to facilitate wire connection between the electronics package and the sensing element;

wire bonding pads and the diaphragm being disposed in planar alignment the machining resulting from an access hole and plug for transverse access to the flat inner surface resulting in a discontinuity in the sidewall from the access hole.

20. The pressure sensor of claim 19 wherein the machined diaphragm surface has a different thickness than surrounding areas of the sidewall.

* * * * *